July 3, 1962 G. J. SHELDON 3,042,022
ILLUMINATION MEANS FOR DIAGNOSTIC INSTRUMENT
Filed May 25, 1959
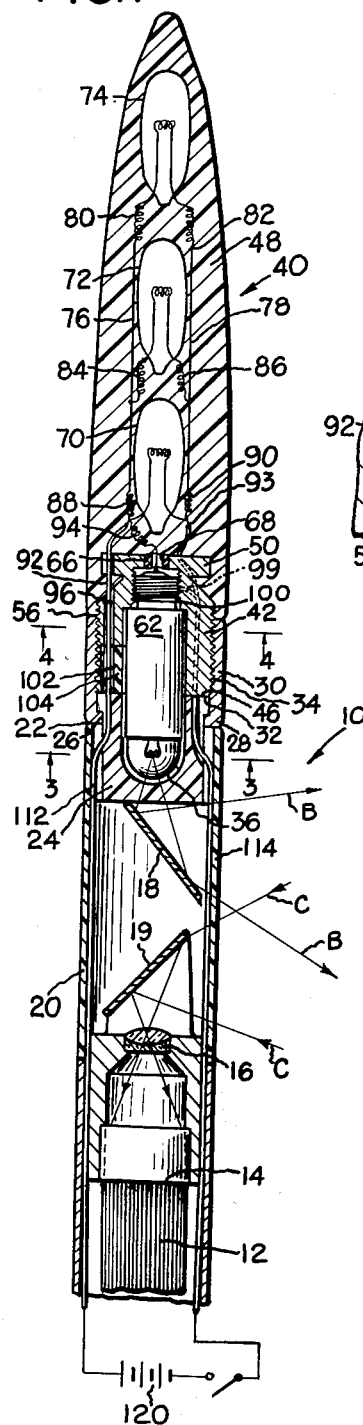
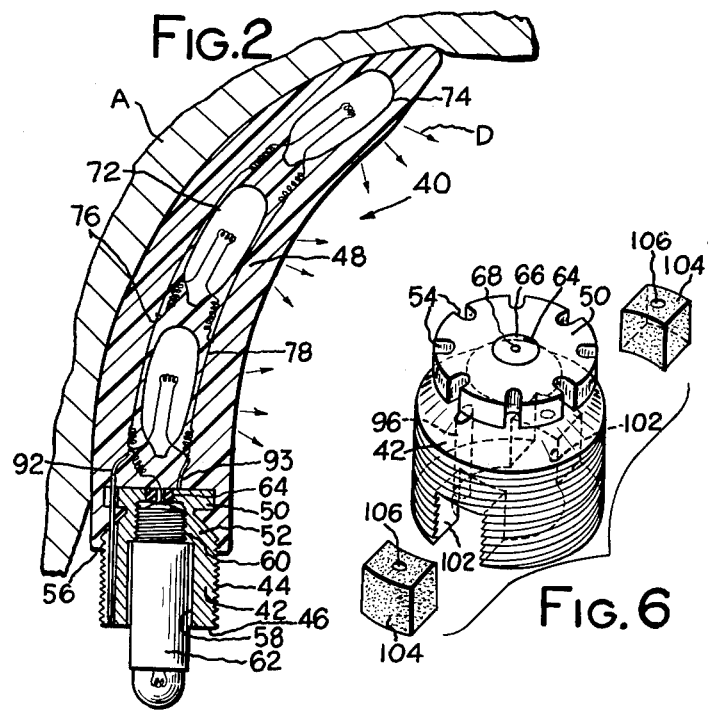
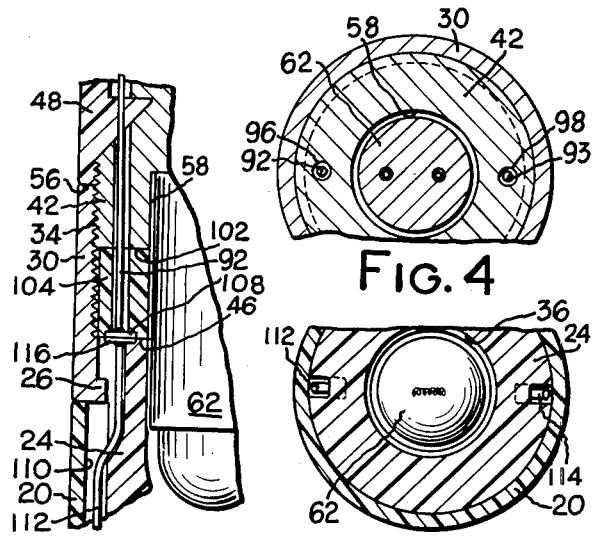
INVENTOR.
GILBERT J. SHELDON
BY *Frank C. Parker*
*Bernard A. Chiama*
ATTORNEYS

United States Patent Office 3,042,022
Patented July 3, 1962

3,042,022
ILLUMINATION MEANS FOR DIAGNOSTIC INSTRUMENT

Gilbert J. Sheldon, Irondequoit, N.Y., assignor to Bausch & Lomb Incorporated, a corporation of New York
Filed May 25, 1959, Ser. No. 815,387
4 Claims. (Cl. 128—23)

This invention relates generally to illumination devices, and more particularly to illuminators for diagnostic instruments such as endoscopes for facilitating examination of body cavities.

The present invention may be utilized for any type of endoscope but the particular type of diagnostic instrument herein shown and to be described is a gastroscope. Instruments of this general character are relatively long, on the order of forty inches, and are provided with multiple aligned optical lens elements or a fiber bundle for transmitting an image of a portion of the stomach of a patient to an observer. Because of the considerable length of the instrument and the use of many lens elements or a bundle of optically aligned fibers, a large amount of light is lost during transmission of the image. In order to maintain the smallness of the diameter of the gastroscope at the distal end and to minimize the amount of electricity conveyed through the scope for illumination purposes, considerable sacrifice has been made at the expense of the amount of illumination provided. This lack of adequate illumination is reflected adversely upon the lighting qualities of the transmitted image rendering the same inadequate for diagnostic purposes. Therefore, it is the principal object of the present invention to provide a novel illuminating device for an endoscope which affords adequate illumination for viewing all portions of a cavity under observation.

The use of gastroscopes on a patient is generally an ordeal for both the observer and particularly to the patient. The movement of the instrument through the esophagus and manipulation therein and the stomach may produce great discomfort, such that the period of time for observation and the number of times the instrument may be inserted and withdrawn may be quite limited. As an incident to this problem it is generally found that a patient must be disposed for accepting the instrument, that is, he may not always be agreeable to its use upon his person. It is desirable then, that the instrument be faithful in operation once the same has been applied to a patient, otherwise, if it must be withdrawn for repairs or adjustment, the chances of utilizing the instrument again immediately is not so certain. It would be exasperating to say the least if, once the instrument is in position for observation, the illuminator lamp burnt out or some stomach mucous came in contact with the lamp so as to obscure the passage of light therefrom. In the event of burn out of the lamp, and the patient is disposed for another try at insertion, it may be necessary to dismantle the instrument completely in order to change lamps, or to send the instrument back to the manufacturer for replacement, either event causing delay and possible loss of acceptance by the patient. Therefore, it is another object of the present invention to provide an illuminator wherein burn out of a lamp will not result in the termination of observation. Another object is to provide an illuminator which may be easily replaced upon complete failure without necessitating the dismantling of the instrument.

Other objects and advantages will become apparent from the following description when taken in conjunction with the drawing wherein:

FIG. 1 is a longitudinal sectional view of the illuminating device of the present invention as applied to an endoscope;

FIG. 2 is a sectional view of the illuminating device as it may be applied to the wall of the cavity;
FIG. 3 is a sectional view taken along the line 3—3 of FIG. 1;
FIG. 4 is a sectional view taken along the line 4—4 of FIG. 1;
FIG. 5 is a fragmentary enlarged view of a detail of the present invention; and
FIG. 6 is an exploded view in perspective of the mounting ring for the illuminating device.

Referring now to FIGS. 1 and 2, there is shown the distal end of an endoscope embodying the present invention and indicated generally by the reference numeral 10. The endoscope comprises an image transmitting means 12 which is illustrated as being in the form of a bundle of optically aligned transparent fibers terminating in a plane 14. It will be understood that the bundle 12 is shown merely for illustration purposes and that other types of image transmitting devices, such as, aligned lens elements, may be utilized. An objective 16 serves to focus the image of a portion of a cavity wall under observation upon the plane 14 for transmission by the bundle 12 to a suitable eyepiece (not shown) for observation purposes. Suitable mirrors 18 and 19 are arranged at an acute angle with respect to the optical axis of the objective 16 and normal to each other in order to direct light rays within a cavity chamber and walls thereof and to direct image forming rays from the cavity walls to the objective in the well known manner. A sheath 20 which may be in the form of a flexible tube structure encased in a plastic covering suitably covers the parts mentioned in order to render the same waterproof and is shown terminating at 22. The interior of the endoscope within which the mirrors 18, 19 are mounted is closed by a plug 24 which may be made of plastic or the like and which is suitably bonded to the interior surface of the sheath 20 adjacent the end 22.

The plug 24 is formed with an annular groove 26 on the periphery thereof and within this groove there is secured against axial movement of the annular flange 28 of a coupling sleeve 30. The outer diameter of the sleeve 30 is the same as the sheath 20 and abuts, at one end, the end 22 of the sheath. Beyond the flange 28, and the outer end wall 32 of the plug 24, the sleeve is formed with internal threads 34 for a purpose which will appear hereinafter. A cylindrical recess 36 is formed axially within the plug and has its open end contiguous with the end wall 32. When assembled, the flange 28 of the sleeve 30 is bonded to the walls of the cooperating portion, namely, groove 26, of the plug 24, and with the plug also being bonded to the sheath 20, the chamber within the sheath is completely air and watertight.

The illuminator for the endoscope so far described is generally indicated by the reference numeral 40 and comprises a metallic mounting sleeve 42 formed with external threads 44 which cooperate with the threaded coupling sleeve 30 for securing the illuminator on the distal end of the endoscope 10. The lower end wall 46 of the sleeve 42 is adapted to be forced against the adjacent end wall 32 of the plug 24 when the sleeve 30 is fully threadedly engaged with the mounting sleeve. This sleeve serves to support a flexible probe 48, preferably made from transparent, moldable plastic, and to this end the sleeve 42 is formed with a radially extending serrated disk 50 which is made integral with a narrow tapered portion 52 of the sleeve 42. The serrations or notches 54 on the periphery of the disk 50 may be of any suitable size and shape but at least two of these are large enough to accommodate wires for the auxiliary illumination means of the present invention. Molded around the disk 50 within the notches 54 and between the disk and the tapered portion 52 is the adjacent end of the flexible probe 48. As shown in FIGS. 1 and 2, the material of the probe 48 also overlaps a few of the threads 44 of the mounting sleeve 42 and terminates in a plane 56 which will be forced against the adjacent end of the sleeve 30 when the illuminator 40 is threadedly secured to the endoscope by the sleeve 30. For maximum support, the material of the probe 48 is bonded to the various structural elements that support the same including the associated threads 44. In this manner, the interior of the probe will be rendered air and watertight.

The mounting sleeve 42 is bored axially thereof to form a cylindrical chamber 58 and counterbored at 60 for receiving a main endoscope lamp 62. Threads formed in the counterbore 60 cooperate with threads on the lamp for retaining the same within the chamber 58. The recess 36, the chamber 58 and the counterbore 60 are axially aligned so that the lamp 62 is completely encompassed within the chamber 58 and the recess 36. Also in axial alignment with the chamber 58 is an opening 64 formed centrally through the disk 50 and within this opening there is secured an annular button 66 made of any suitable insulating material. An aperture 68 is formed axially in the button 66 and serves as a conduit for a conductor to the lamp 62.

Molded axially within the probe 48 and extending longitudinally therealong in spaced relationship along a line are three auxiliary lamps 70, 72, 74, which are held in their respective positions simply by the plastic material of the probe. The auxiliary lamps may be of the same relative size as illustrated or, in the event the proble 48 is formed with a relatively large taper, the lamps may vary in size to conform to the taper. In any event, the size of the lamps should be such that the material of the probe between the lamps and the outside surface of the probe has substantial thickness in order not to reduce the strength and flexibility of the probe. As shown in FIG. 1, the diameter of the lamps 70, 72, 74 is between about one-third to one-half the diameter of the probe.

A pair of lead conductors 76, 78 is also molded within the probe 48 and these conductors extend longitudinally therein and generally parallel to each other. The extreme outer ends of the conductors 76, 78 are formed in a coiled portion 80, 82, respectively, and then continue through the glass of the lamp 74 and connect to the filament of the lamp. Similarly, the intermediate lamp 72 is connected to the lead conductors by a pair of coiled wires 84, 86. The lower ends of each of the lead conductors 76, 78 are also formed in coiled portions 88, 90 for the lower lamp 70 and below the coiled portions, the conductors 76, 78 are electrically connected to wires 92, 93, respectively. The main lamp 62 is electrically connected to the wire 92 by a coiled conductor 94 soldered to the lamp and extending through the opening 68 formed in the insulator 66.

Each of the wires 92, 93, which are of the insulated type, extends through a pair of diametrically opposed notches 54 formed in the disk 50 and a pair of diametrically opposed passageways 96, 98, respectively, formed in the mounting sleeve 42. In order to complete the circuit to the main lamp 62, a short insulated conductor 99 is spliced to the wire 93 and is exposed for connection to the threaded shank 100 of the lamp 62 when the shank is threaded in the sleeve 42. Each of the passageways 96, 98 terminates in cutouts 102, formed in the ring in diametrically opposed relationship and into which are secured insulator segments 104. These segments have the identical shape as the cutout portions and are preferably provided with threads to replace the threads which would otherwise be lost by the metallic material removed to form the cutouts. The segments 104 are also formed with passageways 106 which are axially aligned with the passageways 96, 98, respectively, in order to provide a continuous conduit for the wires 92, 93.

The insulator segments serve as insulating terminal supports for the wires 92, 93, each of which terminates in a conductor bar 108 secured within the end wall 46 of the sleeve 42. The connection of the wires 92, 93 with their respective bars 108 is preferably by solder joints and the outer surfaces of the bars 108 are finished flush with the plane of the end wall 46.

The plug 24 is also formed with diametrically opposed passageways 110 which are arranged for alignment with the passageways 96, 98. A pair of power lines 112, 114 extends through the passageways 110, respectively, and have their ends soldered to conductor bars 116 secured to plug 24 and flush with the plane of the end wall 32 of the plug. When the illuminator 40 is threadedly secured to the endoscope 10, the conductor bars 108 will be forced against the conductor bars 116 and to insure this alignment, indicia lines (not shown) may be scored upon the adjacent outer surface portions of the probe 48 and the sleeve 30 for indicating contact between the conductor bars when the indicia lines are aligned.

The power lines 112, 114 are connected to a suitable source 120 of electric energy for supplying the auxiliary lamps 70, 72 and 74 and the main lamp 62 with current. The power lines may extend interiorly of the endoscope in a well known manner.

During movement of the illuminator 40 within the stomach of a patient, the flexibility of the probe will readily lend itself to permitting smooth probing action along the stomach wall. As shown in FIG. 2, the probe has been flexed by a portion A of the stomach wall and will guide the endoscope along the curve formed by the stomach wall. In this FIG. 2 it will be appreciated that the auxiliary lamps have moved with the flexing of the probe to conform to the bending of the probe. In practice, the axis of alignment of the lamps will always conform with the axis of the probe as to shape and curvature. This is enhanced by the provision of the coil portions 80, 90 and 94 in the various conductors serving the lamps. During flexure of the probe in the plane of the drawing, the inner coiled portions compress slightly and the outer coiled portions will be elongated. When the probe is flexed in a plane normal to the plane of the drawing, all coiled portions merely flex in the manner of a coil spring. This structure eliminates any tendency of the lamps in the probe and the conductors from shifting laterally within the material of the probe and thereby prevents undue stress being placed upon the conductors and the lamps and also prevents damage to the probe material. This is accomplished by the coiled portions 80, 90 and 94 functioning as universal connections between the adjacent lamps.

The complete illuminator unit is illustrated in FIG. 2 and this unit may be readily disconnected from the endoscope in the event that one or more of the lamps becomes inoperative during use. Because of the simplicity of the unit and the inexpensiveness of the parts, this unit may be removed from the endoscope and thrown away in case of damage or malfunction thereto. The main lamp, of course, may be simply screwed out of its socket and replaced, however, if one of the auxiliary lamps is inoperative, the probe may still be utilized but with reduced illumination. With the lamps being connected in parallel circuit, the burning out of one does not affect the other. During use of the endoscope within the stomach of a patient, in the event one of the lamps is burned out, the remaining lights will suffice for observation purposes.

As shown in FIGS. 1 and 2, by the light rays B, light from the main lamp 62 is directed upon the mirror 18 where it is reflected outward toward an object to be observed. Incoming image forming light rays C are reflected by the mirror 19 which directs these rays upon the objective 16. The auxiliary lamps send out light rays D in all directions through the transparent material of the probe and thereby assist in the illumination of the object to be viewed by illuminating the surrounding space for 360°. Incoming image forming light rays resulting from the rays D would enter the endoscope by means of the mirror 19 as was the case with the image forming light rays produced by the light rays B.

From the foregoing, it will be apparent that the principal object of the present invention, that of affording adequate illumination for viewing all portions of a cavity under observation, is achieved. It is also apparent that there is provided an endoscope illuminator which may be easily replaced upon complete failure thereof. Other advantages are also readily apparent, such as, minimum of parts which are simple and inexpensive. While there is in this application specifically described a preferred embodiment which the invention may assume in practice, it will be understood that the same is shown for purposes of illustration only, and that the same may be modified and embodied in various other forms or employed in other uses without departing from their spirit or the scope of the appended claims.

I claim:

1. An illuminating device for attachment to the front end of an endoscope or the like comprising a flexible light transmitting probe portion, a plurality of flexible electric lamps formed in cavities in said portion in spaced alignment along the longitudinal axis thereof, electrical leads extending through said portion and connected to filaments in said lamps for energizing them, and means for securing said portion to the endoscope at the front thereof and in alignment therewith.

2. An illuminating device for attachment to the front end of an endoscope or the like comprising a flexible transparent elongated probe, a plurality of electric lamps sealed within said probe flexing relative to each other as said probe flexes in spaced alignment along the longitudinal axis thereof, electrical leads extending in the flexible material of said probe and connected to said lamps for energizing them, lamp mounting means at the attachment end of said probe for mounting a lamp facing away from said plurality of lamps, said leads being connected to said mounting means for energizing a lamp held therein, and means for securing said probe at the attachment end thereof to an endoscope at the front thereof and in alignment therewith.

3. An illuminating device for attachment to the front end of an endoscope or the like comprising a flexible light transmitting probe portion, a plurality of electric lamps formed integral within said portion in spaced alignment along the longitudinal axis thereof and flexing relative to each other, electrical leads extending through said portion and connected to said lamps for energizing them, coiled portions of said leads between each two of said lamps being coiled to facilitate flexing of said probe portion, and means for securing said portion to the endoscope at the front thereof and in alignment therewith.

4. An illuminating device for attachment to the front end of an endoscope or the like comprising an elongated flexible probe molded of a transparent plastic material, a plurality of electric lamps molded within said probe in spaced alignment along the longitudinal axis thereof, electrical leads also molded in said probe and connected to said lamps for energizing them, and means for securing said probe to an endoscope at the front end thereof and in alignment therewith.

References Cited in the file of this patent

UNITED STATES PATENTS

| | | |
|---|---|---|
| 1,550,197 | Berry | Aug. 18, 1925 |
| 1,989,162 | Barr | Jan. 29, 1935 |
| 2,243,992 | Wappler | June 3, 1941 |
| 2,877,368 | Sheldon | Mar. 10, 1959 |

FOREIGN PATENTS

| | | |
|---|---|---|
| 623,247 | Germany | Dec. 16, 1935 |
| 738,019 | Great Britain | Oct. 5, 1955 |
| 1,126,571 | France | July 20, 1956 |

UNITED STATES PATENT OFFICE

CERTIFICATE OF CORRECTION

Patent No. 3,042,022

July 3, 1962

Gilbert J. Sheldon

It is hereby certified that error appears in the above numbered patent requiring correction and that the said Letters Patent should read as corrected below.

Column 2, line 2, for "the", second occurrence, read -- a --; line 40, strike out "of"; first occurrence, column 3, line 31, for "proble" read -- probe --.

Signed and sealed this 6th day of November, 1962.

(SEAL)
Attest:

ERNEST W. SWIDER
Attesting Officer

DAVID L. LADD
Commissioner of Patents